US011216262B2

(12) United States Patent
Czarnecki et al.

(10) Patent No.: US 11,216,262 B2
(45) Date of Patent: Jan. 4, 2022

(54) DEVICE PROVISIONING

(71) Applicant: Microsoft Technology Licensing, LLC, Redmond, WA (US)

(72) Inventors: Austin Tyler Czarnecki, Seattle, WA (US); Vladimir Holostov, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 748 days.

(21) Appl. No.: 15/081,809

(22) Filed: Mar. 25, 2016

(65) Prior Publication Data

US 2017/0277525 A1    Sep. 28, 2017

(51) Int. Cl.
| | |
|---|---|
| *G06F 8/61* | (2018.01) |
| *H04W 4/50* | (2018.01) |
| *H04L 12/24* | (2006.01) |
| *G06Q 30/06* | (2012.01) |
| *H04W 8/18* | (2009.01) |
| *G06Q 10/10* | (2012.01) |

(52) U.S. Cl.
CPC ........... *G06F 8/61* (2013.01); *G06Q 30/0601* (2013.01); *H04L 41/0806* (2013.01); *H04L 41/0853* (2013.01); *H04W 4/50* (2018.02); *H04W 8/18* (2013.01); *G06Q 10/10* (2013.01)

(58) Field of Classification Search
CPC ......... H04W 12/06; H04W 4/50; H04W 8/18; G06F 8/60; G06F 8/61; H04L 41/0806; H04L 41/0853; G06Q 30/0601; G06Q 10/10; G06Q 10/087
See application file for complete search history.

(56) References Cited

U.S. PATENT DOCUMENTS

| | | | |
|---|---|---|---|
| 7,039,688 B2 | 5/2006 | Matsuda et al. | |
| 7,567,795 B1* | 7/2009 | Champion | H04M 3/38 |
| | | | 455/410 |
| 8,014,722 B2 | 9/2011 | Abel et al. | |
| 8,433,618 B2* | 4/2013 | Marsh | G06Q 10/06311 |
| | | | 705/26.5 |
| 8,523,073 B2 | 9/2013 | Tam et al. | |
| 8,683,226 B2 | 3/2014 | Popp et al. | |
| 8,710,953 B2 | 4/2014 | Warrier | |
| 8,799,428 B2 | 8/2014 | Herbert et al. | |

(Continued)

FOREIGN PATENT DOCUMENTS

| | | |
|---|---|---|
| CN | 101971656 A | 2/2011 |
| EP | 2079256 A1 | 7/2009 |
| EP | 1937008 B1 | 8/2010 |

(Continued)

OTHER PUBLICATIONS

Alliance between SoftWatch and Software Licensing Advisors saves companies Millions on Microsoft Licensing. PR Newswire. Sep. 12, 2012. (Year: 2012).*
"Automated Provisioning and Deployment," In VMware White Paper, Feb. 1, 2013, pp. 1-20.
Edwards et al., "Web Ops 2.0 Achieving Fully Automated Provisioning," In White Paper, Aug. 15, 2009, pp. 1-10.

(Continued)

*Primary Examiner* — William J Allen (57) ABSTRACT

A facility for provisioning a device is described. The facility discerns an identifier that identifies the device, and transmits the identifier to a server computer system. The facility receives from the server computer system provisioning measures specified for the device. In response to receiving the specified provisioning measures, the facility performs the specified provisioning measures on the device.

20 Claims, 9 Drawing Sheets

(56) References Cited

U.S. PATENT DOCUMENTS

| | | | |
|---|---|---|---|
| 2007/0049265 A1 | 3/2007 | Kaimal et al. | |
| 2009/0181662 A1* | 7/2009 | Fleischman | H04W 8/183 455/419 |
| 2010/0180016 A1* | 7/2010 | Bugwadia | G06F 9/4411 709/220 |
| 2013/0111541 A1* | 5/2013 | Yin | G06F 21/577 726/1 |
| 2013/0219155 A1* | 8/2013 | Barrus | G06F 9/4401 713/1 |
| 2014/0031010 A1* | 1/2014 | Wuergler | H04W 12/06 455/411 |
| 2014/0181521 A1 | 6/2014 | Hemphill et al. | |
| 2014/0310350 A1 | 10/2014 | Borggaard et al. | |
| 2015/0054621 A1 | 2/2015 | Lin et al. | |
| 2017/0147827 A1* | 5/2017 | Bowers | G06F 21/577 |

FOREIGN PATENT DOCUMENTS

| | | |
|---|---|---|
| WO | 2013062847 A1 | 5/2013 |
| WO | 2014126797 A1 | 8/2014 |

OTHER PUBLICATIONS

"Automated Provisioning Extensibility Engineering Services," Retrieved on: Dec. 10, 2015, Available at https://www.arista.com/assets/data/pdf/Service_Description_Automated_Provisioning.pdf.

"International Search Report and Written Opinion Issued in PCT Application No. PCT/US2017/023123", dated Jul. 10, 2017, 12 pages.

"First Office Action and Search Report Issued in Chinese Patent Application No. 201780019643.2", dated Nov. 26, 2020, 14 Pages.

"Second Office Action Issued in Chinese Patent Application No. 201780019643.2", dated Jun. 21, 2021, 8 Pages.

* cited by examiner

| proxy identifier table | | 400 |
|---|---|---|
| proxy device id | device id | |
| 11335577 | 7410258963 | 401 |
| 22446688 | 1357924680 | 402 |
| 34343434 | 7896541230 | 403 |
| 77777777 | 5553337771 | 404 |
| 81818181 | 7685493012 | 405 |
| 411 | 412 | |

| buyer table | | 600 |
|---|---|---|
| proxy device id | buyer | |
| 11335577 | PrudentCo | 601 |
| 34343434 | PrudentCo | 602 |
| 81818181 | FriendlyOffice | 603 |
| 611 | 612 | |

| configuration id | provisioning measure | |
|---|---|---|
| 876532 | install security suite | 801 |
| 876532 | configure VPN | 802 |
| 741258 | uninstall Android operating system | 803 |
| 564578 | set carrier id registry setting to "Cirrus" | 804 |
| 564578 | set Cirrus brand wallpaper | 805 |
| 747474 | install security suite | 806 |
| 747474 | configure VPN | 807 |
| 747474 | install productivity suite | 808 | configuration table — 800

| from buyer | from proxy device id | from group id | to configuration id | to group id | |
|---|---|---|---|---|---|
| FriendlyOffice | | | 741258 | | ← 901 |
| | 11335577 | | 876532 | | ← 902 |
| | 34343434 | | | 4122 | ← 903 |
| | | 4122 | 747474 | | ← 904 |
| ↑911 | ↑912 | ↑913 | ↑921 | ↑922 | | buyer configuration table — 900

*FIG. 9*

| proxy device id | carrier | |
|---|---|---|
| 22446688 | Cirrus | ← 1001 |
| 77777777 | Cirrus | ← 1002 |
| ↑1011 | ↑1012 | | carrier table — 1000

*FIG. 10*

| from carrier | from proxy device id | from group id | to configuration id | to group id | |
|---|---|---|---|---|---|
| | 22446688 | | | 1362 | ← 1101 |
| | 77777777 | | | 1362 | ← 1102 |
| | | 1362 | 564578 | | ← 1103 |
| ↑1111 | ↑1112 | ↑1113 | ↑1121 | ↑1122 | | carrier configuration table — 1100

| cache to configuration id table | 1400 |
| --- | --- |
| device id | configuration id |
| 1357924680 | 564578 — 1401 |
| 5553337771 | 564578 — 1402 |
| 7410258963 | 876532 — 1403 |
| 7685493012 | 741258 — 1404 |
| 7896541230 | 747474 — 1405 |

| cache to provisioning measures table | 1500 |
| --- | --- |
| device id | provisioning measures |
| 1357924680 | set carrier id registry setting to "Cirrus" — 1501 |
| 1357924680 | set Cirrus brand wallpaper — 1502 |
| 5553337771 | set carrier id registry setting to "Cirrus" — 1503 |
| 5553337771 | set Cirrus brand wallpaper — 1504 |
| 7410258963 | install security suite — 1505 |
| 7410258963 | configure VPN — 1506 |
| 7685493012 | uninstall Android operating system — 1507 |
| 7896541230 | install security suite — 1508 |
| 7896541230 | configure VPN — 1509 |
| 7896541230 | install productivity suite — 1510 |

DEVICE PROVISIONING

BACKGROUND

Provisioning or configuring a computer system, smart phone, or similar device refers to preparing the device for use by a user, such as by installing and configuring operating systems, applications, other programs, etc. In a large organization, it is typical for dedicated technical support personnel to provision devices as they are purchased using a largely manual process, and re-provision them when the users' needs change, they are reassigned to other users, etc.

SUMMARY

This summary is provided to introduce a selection of concepts in a simplified form that are further described below in the Detailed Description. This summary is not intended to identify key factors or essential features of the claimed subject matter, nor is it intended to be used to limit the scope of the claimed subject matter.

A facility for provisioning a device is described. The facility discerns an identifier that identifies the device, and transmits the identifier to a server computer system. The facility receives from the server computer system provisioning measures specified for the device. In response to receiving the specified provisioning measures, the facility performs the specified provisioning measures on the device.

DETAILED DESCRIPTION

The inventors have recognized that conventionally provisioning computer systems, smart phones, and similar devices in an organization having a significant number of users consumes substantial levels of skilled manual effort, significantly adding to the acquisition and redeployment costs of devices; delaying their availability to their users; and interfering with the ability of technical support personnel to address a variety of other needs.

Accordingly, the inventors have conceived and reduced to practice a software and/or hardware facility "(the facility)" for automatically provisioning devices based upon, for example, the organization to which they are sold (their "buyer"), a wireless carrier on whose network they will operate (their "carrier"), etc.

In some examples, one or more device manufacturers provide to the facility a mapping between, for each device, an innate identifier for the device ("device identifier") that can be determined by software executing on the device and a proxy identifier for the device ("proxy device identifier") that, for example, is printed on the device and/or its packaging, is listed as its serial number on invoices and in inventory and order tracking systems, etc. In various examples, the facility uses one or more different mechanisms for specifying the device identifier, including a value produced for the device by its Trusted Platform module, a value produced for the device by the secure element of its Near-Field Communication module, network interface Media Access Control address, processor serial number, motherboard serial number, operating system serial number, etc. In various examples, the device identifier is globally unique, unique with respect to a single manufacturer, unique with respect to a particular carrier, unique in combination with various other information, etc. In some examples, the facility omits to use a proxy device identifier, and instead uses each device's device identifier throughout the process of distributing the device.

In some examples, sellers of devices provide to the facility for the devices they sell a mapping between the device's proxy device identifier and the device's buyer. In some examples, sellers of devices provide to the facility for the devices they sell a similar mapping between the device's proxy device identifier and the device's carrier. In various examples, these sellers can be original equipment manufacturers who sell directly, resellers with retail locations, resellers that ship or deliver devices directly to customers, etc. In various examples, in order to provide this information, information systems of the sellers collaborate with the facility, including sales systems, order processing systems, retail point-of-sale terminals, inventory systems, accounting systems, etc. In some examples, at a time when an original purchaser of the device resells the device, they become its seller with respect to the facility, and they and/or the new buyer have an opportunity to change the purchaser identity maintained for the device by the facility, enabling the new buyer to control the device's provisioning and re-provisioning.

In various examples, the facility enables provisioning measures to be specified for devices in a variety of ways, by a variety of parties. As examples, a manufacturer, seller, or carrier can specify a particular configuration of provisioning measures for all of a buyer's devices, all of a buyer's devices in a particular group or class, or all of the manufacturer's devices or devices in a particular group or class across buyers. A buyer can specify a particular configuration of provisioning measures for all of the buyer's devices, individual ones of the buyer's devices, or groups or classes of the buyer's devices. A carrier can specify a particular configuration of provisioning measures for all of the carrier's devices, or all of the carrier's devices in a particular group or class. These device groups and classes can be based on such device attributes as hardware model, operating system, operating system version, device location, user group or class, etc. In some examples, the facility operates on behalf of individual or personal buyers of a device.

When a device is first used, such as when it's operating system is first executed, the device sends a request containing the device's device identifier to a provisioning server or other provisioning control agent. The provisioning server determines a set of provisioning measures that have been specified for the device, and send the device a response identifying these provisioning measures, which the device then performs. In some examples, the provisioning server handles provisioning requests from devices using cached combinations of provisioning information received and stored separately by the facility.

In some examples, the device periodically sends additional provisioning requests. This enables the device to be re-provisioned such as (1) to install a newly-available program, (2) to be equipped for a new user, (3) to be disabled after being stolen or lost, etc. to cause this to occur, the buyer can specify a set of new provisioning measures for the device, or for the group of devices that includes the device. In some examples, where the device is stolen or lost, the facility further causes the device to be entered into systems for tracking the device's location, causes insurance claims and police reports to be filed, etc.

By performing in some or all of the ways described above, the facility enables buyers and carriers to efficiently and reliably provision new devices, and re-provision them as needed.

Figure 1:
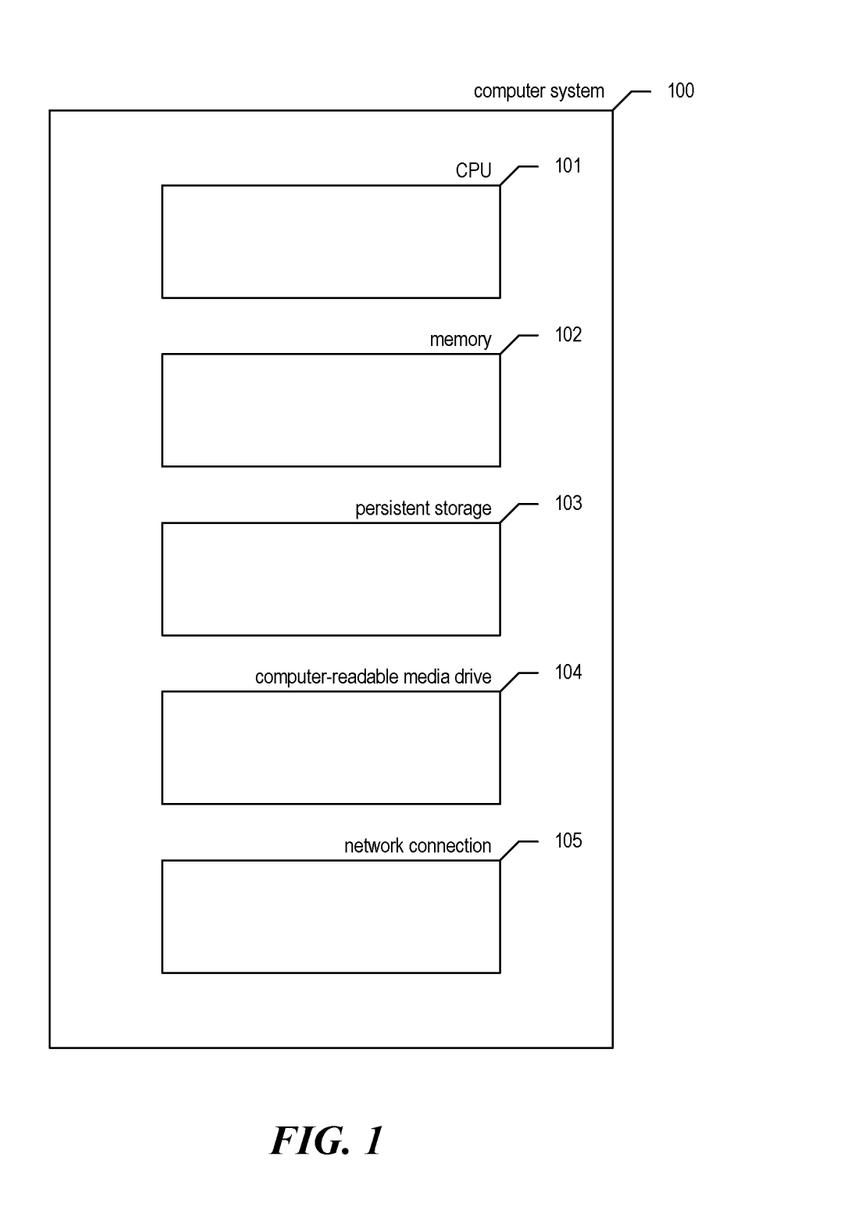
FIG. 1 is a block diagram showing some of the components typically incorporated in at least some of the computer systems and other devices on which the facility operates.

FIG. 1 is a block diagram showing some of the components typically incorporated in at least some of the computer systems and other devices on which the facility operates. In various embodiments, these computer systems and other devices 100 can include server computer systems, desktop computer systems, laptop computer systems, netbooks, tablet computers, smart phones, personal digital assistants, televisions, cameras, automobile computers, kiosk computers, electronic whiteboards, electronic media players, Internet-connected refrigerator, thermostat, or smoke detector, etc. In various embodiments, the computer systems and devices include zero or more of each of the following: a central processing unit ("CPU") 101 for executing computer programs; a computer memory 102 for storing programs and data while they are being used, including the facility and associated data, an operating system including a kernel, and device drivers; a persistent storage device 103, such as a hard drive or flash drive for persistently storing programs and data; a computer-readable media drive 104, such as a floppy, CD-ROM, or DVD drive, for reading programs and data stored on a computer-readable medium; and a network connection 105 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

Figure 2:
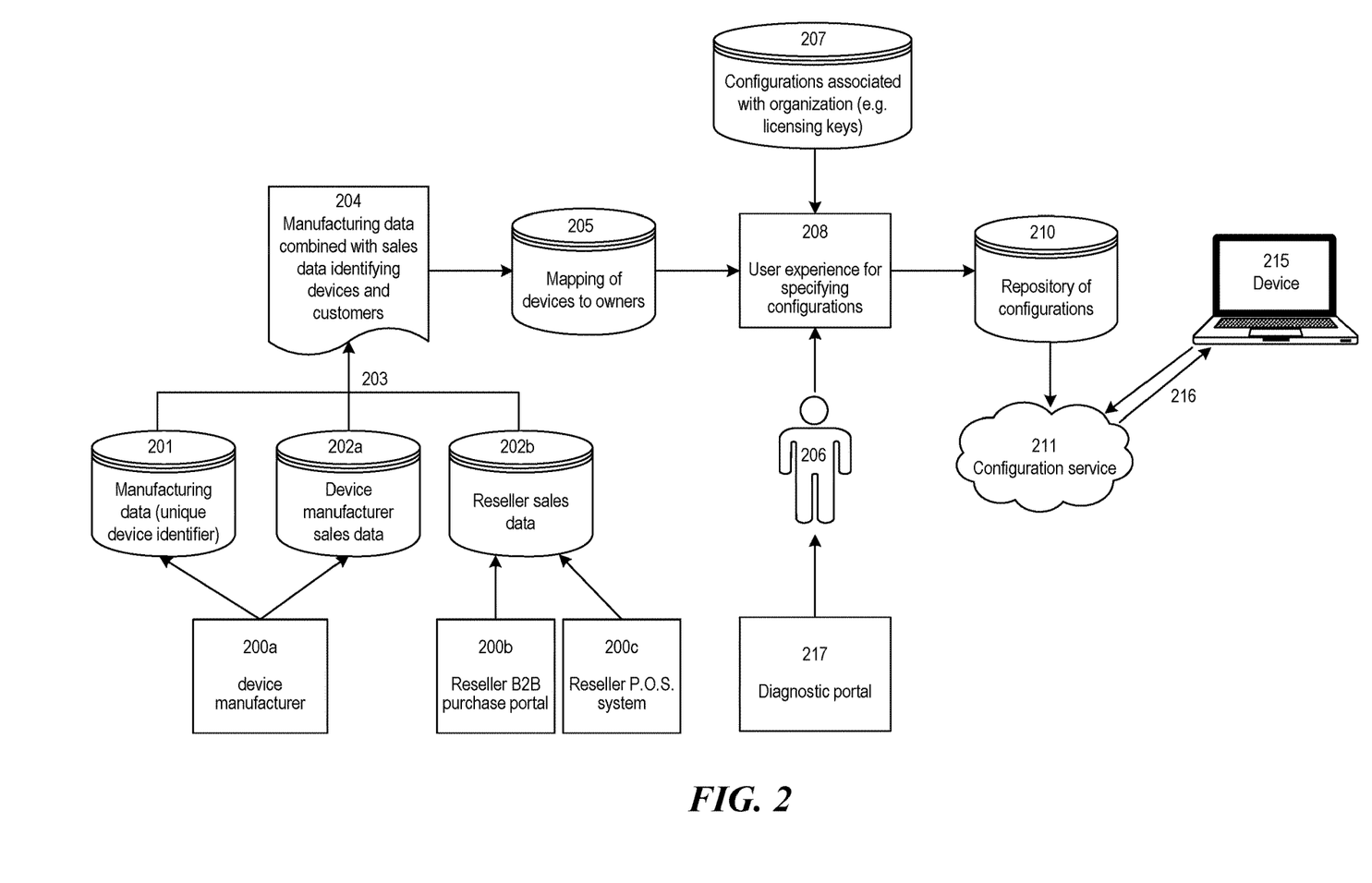
FIG. 2 is a data flow diagram showing sample data flows that occur in the operation of the facility in some examples.
Figure 3:
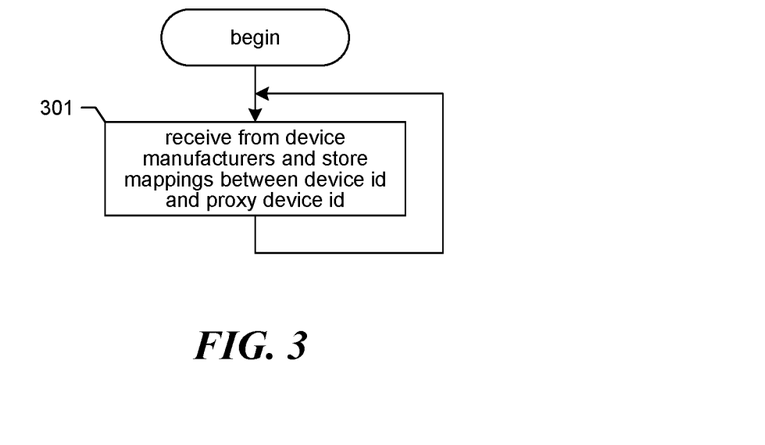
FIG. 3 is a flow diagram showing a process that may be performed by the facility in some examples to receive data mapping between a device's proxy device ID and the device's device ID.
Figure 4:
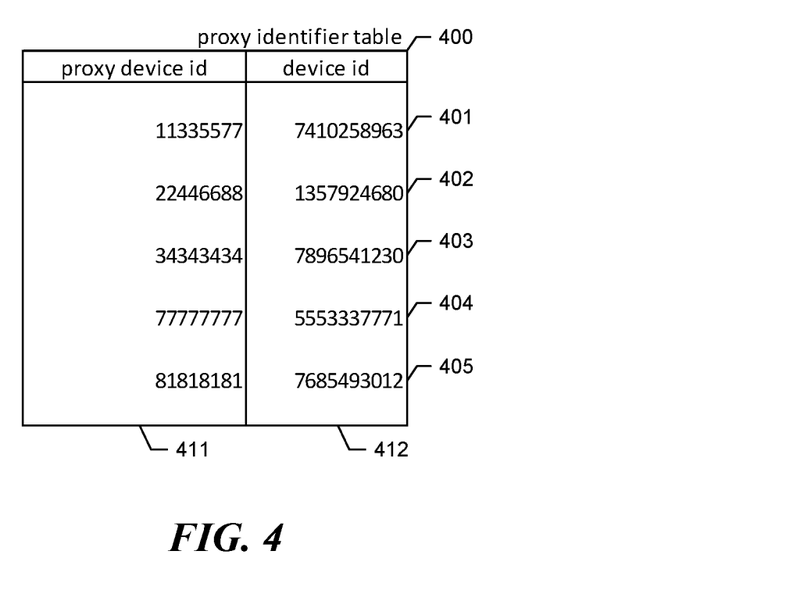
FIG. 4 is a table diagram showing a sample proxy identifier table that may be used by the facility in some examples to store received data mapping between a device's proxy device ID and the device's device ID

FIG. 2 is a data flow diagram showing sample data flows that occur in the operation of the facility in some examples. Each of one or more device manufacturers 200a provides the facility access to manufacturing data 201, which maps between device ID and proxy device ID. Additional details about this data are shown in FIGS. 3 and 4 and discussed below.

Figure 5:
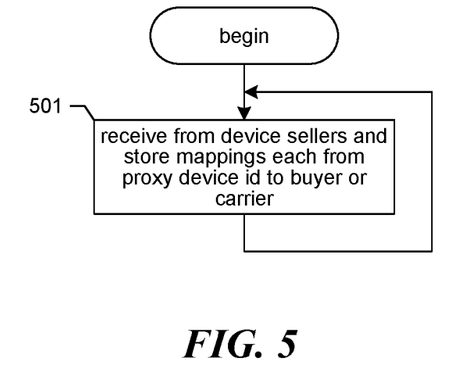
FIG. 5 is a flow diagram showing a process that may be performed by the facility in some examples to receive data mapping between a device's proxy device ID and the device's buyer and/or wireless carrier.
Figure 6:
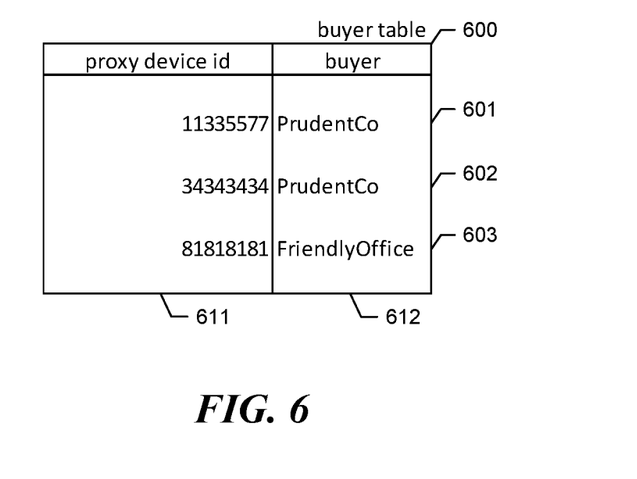
FIG. 6 is a table diagram showing a sample buyer table that may be used by the facility in some examples to store received data mapping between a device's proxy device ID and the device's buyer.

Each manufacturer further provides the facility access to data 202a regarding direct device sales by the manufacturer, identifying for each device directly sold by the manufacturer the buyer, and, in some examples, the wireless carrier. Additional details about this data are shown in FIGS. 5 and 6 and discussed below. In some examples, in order to establish a chain of trust as devices transfer ownership from entity to entity, manufacturers provide the facility access to data regarding devices sold by the manufacturer through a reseller.

Each of one or more device resellers may provide the facility access to data 202b identifying for each device sold by the reseller the buyer, and, in some examples, the wireless carrier. In various examples, the device resellers provide this information via, for example, a B2B device purchase portal 200b, a retail point-of-sale system 200c, and/or an inventory tracking system or other mechanism for tracking which devices are sold to which customer.

In various examples, various other parties provide similar information to the facility, such as the buyer, the vendor of the device operating system or other device software, etc.

The facility performs a process 203 to combine data 201, 202a, and 202b into data 204 that maps from device IDs to proxy device IDs, buyers, and wireless carriers, stored at 205.

In 207-208, the buyer 206 can define configurations made up of provisioning measures and assign them to particular devices or groups of devices. These are stored across buyers and carriers in one or more configuration repositories 110. This process is shown in FIGS. 7-11 and discussed below.

A configuration service 111 responds to provisioning requests 116 from devices 115. In some embodiments, the provisioning requests include each requesting device's device ID. In some examples, the provisioning requests contain a variety of other information usable by the facility to determine what configuration to send to the requesting device. Each response identifies provisioning measures that should be performed on the device. This process is shown in FIGS. 12-15 and discussed below.

A buyer can use a diagnostic portal 117 or other data stream of device telemetry information to view diagnostic information about the buyer's devices and the status of provisioning.

While in various examples the facility operates in an environment such as the one described above, those skilled in the art will appreciate that the facility may be implemented in a variety of other environments including a single, monolithic computer system, as well as various other combinations of computer systems or similar devices connected in various ways. In various embodiments, a variety of computing systems or other different client devices may be used.

FIG. 3 is a flow diagram showing a process that may be performed by the facility in some examples to receive data mapping between a device's proxy device ID and the device's device ID. At 301, the facility receives these mappings from a device manufacturer and stores them, such as in a proxy identifier table shown in FIG. 4 and discussed below. After 301, the facility continues at 301 to receive and store further such mappings.

In various examples, the provisioning measures specified and performed using the facility span a wide variety of types of provisioning measures; in various examples, they identify: an operating system to install, an operating system setting to impose, an operating system setting to remove, an operating system to uninstall, a driver to install, a driver setting to impose, a driver setting to remove, a driver to uninstall, an application to install, an application setting to impose, an application setting to remove, an application to uninstall, security software to install, a security software setting to impose, a security software setting to remove, security software to uninstall, a registry setting to impose, a registry setting to remove, a wireless network to configure, a virtual private network to configure, a security certificate to install, a security certificate to delete, an encryption key to store, an encryption key to delete, mailbox contents to copy, mailbox contents to delete, calendar contents to copy, calendar contents to delete, contact list contents to copy, contact list contents to delete, task list contents to copy, task list contents to delete, a desktop image to display, configuration of an on-premise or cloud-based management endpoint such as one that performs Mobile Device Management, configuration of a local or cloud-based identity provider such as an active directory domain, cloud service active directory domain, local identity, administrative profile, configuration of an organization's specific identifier on the device such as computer name or asset tag number, etc.

Those skilled in the art will appreciate that the acts shown in FIG. 3 and each of the flow diagrams discussed below may be altered in a variety of ways. For example, the order of the acts may be rearranged; some acts may be performed in parallel; shown acts may be omitted, or other acts may be included; a shown act may be divided into sub-acts, or multiple shown acts may be combined into a single act, etc.

FIG. 4 is a table diagram showing a sample proxy identifier table that may be used by the facility in some examples to store received data mapping between a device's proxy device ID and the device's device ID. The proxy identifier table 400 is made up of rows, such as rows 401-405, each corresponding to a different device. Each row is divided into the following columns: a proxy device ID column 411 containing the proxy device ID of the device to which the row corresponds; and a device ID column 412 containing the device ID of the device to which the row corresponds. For example, row 401 indicates that the device having device ID 7410258963 has proxy device ID 11335577. That is, this device is identified externally by the Ser. No. 11/335,577, and software running on the device can retrieve the innate identifier 7410258963. It can be seen that, in the examples shown in the drawings, device IDs have 10 digits, and proxy device IDs have 8 digits.

While FIG. 4 and each of the table diagrams discussed below show a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed and/or encrypted; may contain a much larger number of rows than shown, etc.

FIG. 5 is a flow diagram showing a process that may be performed by the facility in some examples to receive data mapping between a device's proxy device ID and the device's buyer and/or wireless carrier. At 501, the facility receives these mappings and stores them, such as in a buyer table shown in FIG. 6, and in a carrier table shown in FIG. 10, both discussed below. In various examples, the facility receives these mappings from the manufacturer, a reseller, the carrier, and/or the buyer. After 501, the facility continues at 501 to receive and store further such mappings.

FIG. 6 is a table diagram showing a sample buyer table that may be used by the facility in some examples to store received data mapping between a device's proxy device ID and the device's buyer. The buyer table 600 is made up of rows, such as rows 601-603, each corresponding to a different device. Each row is divided into the following columns: a proxy device ID column 611 containing the proxy device ID of the device to which the row corresponds; and a buyer column 612 identifying the buyer of the device to which the row corresponds. For example, row 601 indicates that the device having proxy device ID 11335577 was purchased by a buyer called "PrudentCo". In some examples, the facility uses a carrier table shown in FIG. 10 and discussed below that is similar to the buyer table.

Figure 7:
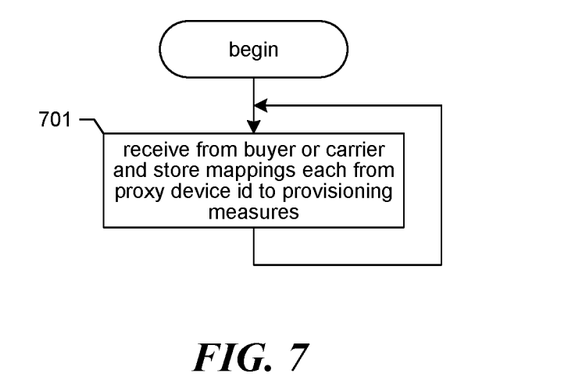
FIG. 7 is a flow diagram showing a process that may be performed by the facility in some examples to receive data mapping between a device's proxy device ID and provisioning measures specified for the device.

FIG. 7 is a flow diagram showing a process that may be performed by the facility in some examples to receive data mapping between a device's proxy device ID and provisioning measures specified for the device. At 701, the facility receives these mappings and stores them, such as in a configuration table shown in FIG. 8, in a buyer configuration table shown in FIG. 9, and/or in a carrier configuration table shown in FIG. 11, all discussed below. In various examples, the facility receives these mappings from the buyer and/or the carrier. After 701, the facility continues at 701 to receive and store further such mappings.

Figure 8:
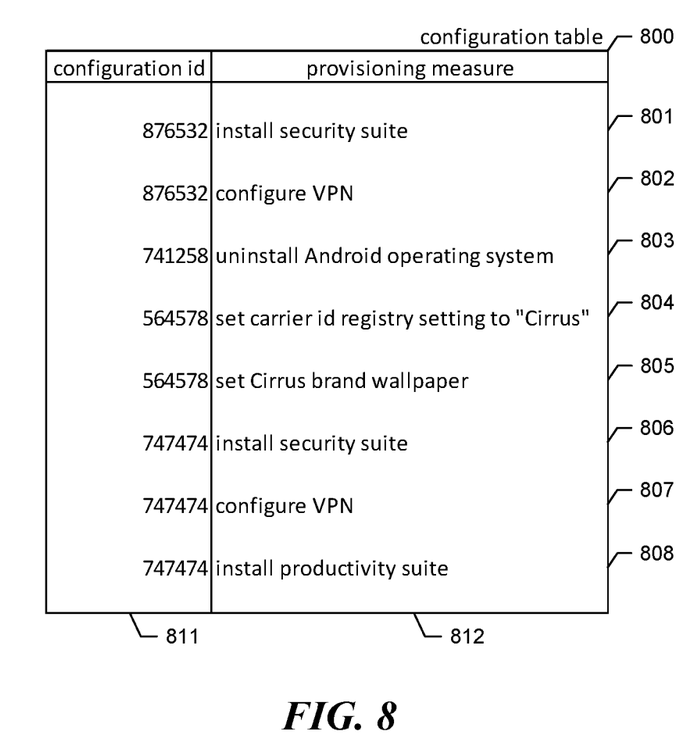
FIG. 8 is a table diagram showing a sample configuration table that may be used by the facility in some examples to store received data mapping between a configuration ID assigned to a set of provisioning measures to be applied to the same device and those provisioning measures.

FIG. 8 is a table diagram showing a sample configuration table that may be used by the facility in some examples to store received data mapping between a configuration ID assigned to a set of provisioning measures to be applied to the same device and those provisioning measures. The configuration table 600 is made up of rows, such as rows 801-808, each corresponding to a provisioning measure assigned to a particular configuration ID. Each row is divided into the following columns: a configuration ID column 811 containing the configuration ID to which the row corresponds; and a provisioning measure column 812 specifying a provisioning measure assigned to the configuration ID. For example, rows 801-802 collectively indicate that the configuration having configuration ID 876532 is made up of two provisioning measures, "install security suite" and "configure VPN". In various examples, the facility uses a variety of approaches to specifying provisioning measures, such as in column 812 of the configuration table and among data received at 701 in FIG. 7, including a textual name or description; a numeric identifier; a provisioning command, instruction, macro, etc.; a library routine or entry point; a registry key/value pair; a reference to an external location at which the provisioning measure is defined; security certificates, WiFi network profiles, application binary bits, or any other resource implicated in the provisioning process, etc. It can be seen that, in the examples shown in the drawings, configuration IDs have 6 digits.

Figure 9:
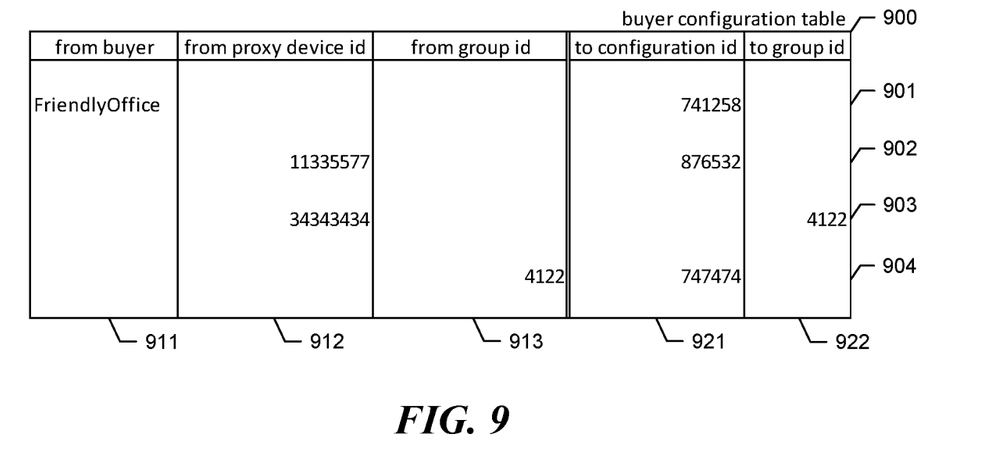
FIG. 9 is a table diagram showing a sample buyer configuration table that may be used by the facility in some examples to store correspondences specified by buyers between configuration IDs defined in the configuration table and particular devices.

FIG. 9 is a table diagram showing a sample buyer configuration table that may be used by the facility in some examples to store correspondences specified by buyers between configuration IDs defined in the configuration table and particular devices. The buyer configuration table 900 is made up of rows, such as rows 901-904. Each row represents either (1) a mapping directly from buyer identity, proxy device ID, or group ID to a configuration ID defined in the configuration table shown in FIG. 8 (here rows 901, 902, and 904), or (2) a mapping from a proxy device ID to a group ID of a group of devices to which the device having the proxy device ID belongs for provisioning purposes (here row 903). For rows of the first type, to configuration ID column 921 contains a configuration ID that is being assigned to one or more devices, and either (a) from buyer column 911 contains the identity of a buyer all of whose devices is being assigned the configuration ID, (b) from proxy device ID column 912 contains the proxy device ID of a single device that is being assigned the configuration ID, or (c) from group ID column 913 contains the group ID of the group of devices that is being assigned the configuration ID. For example, (a) row 901 indicates that all devices purchased by the "FriendlyOffice" buyer are assigned configuration ID 741258; (b) row 902 indicates that the device having proxy device ID 11335577 is assigned configuration ID 876532 (Based on rows 801 and 802 of the configuration table shown in FIG. 8, this means that this device is assigned the provisioning measures "install security suite" and "configure VPN"); and (c) row 904 indicates that devices in the group of devices having group ID 4122 are assigned configuration ID 747474. For rows of the second type, from proxy device ID column 912 contains a proxy device ID of a device that is a member of a device group having the group ID contained in the 2 group ID column 922. For example, row 903 indicates that the device having proxy device ID 343434 is a member of the device group having group ID 4122. It can be seen that, in the examples shown in the drawings, group IDs have 4 digits. In some examples, the facility uses a carrier configuration table shown in FIG. 11 and discussed below that is similar to the buyer configuration table.

Figure 10:
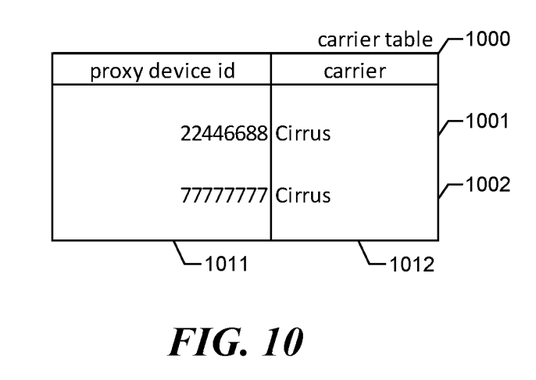
FIG. 10 is a table diagram showing a sample carrier table that may be used by the facility in some examples to store received data mapping between a device's proxy device ID and the device's carrier.

FIG. 10 is a table diagram showing a sample carrier table that may be used by the facility in some examples to store received data mapping between a device's proxy device ID and the device's carrier. In a manner similar to the buyer table shown in FIG. 6 and discussed above, the carrier table 1000 is made up of rows, such as rows 1001-1002, each corresponding to a different device. Each row is divided into the following columns: a proxy device ID column 1011 containing the proxy device ID of the device to which the row corresponds; and a carrier column 1012 identifying the buyer of the device to which the row corresponds. For example, row 1001 indicates that the device having proxy device ID 22446688 was registered on the wireless network of the carrier "Cirrus".

Figure 11:
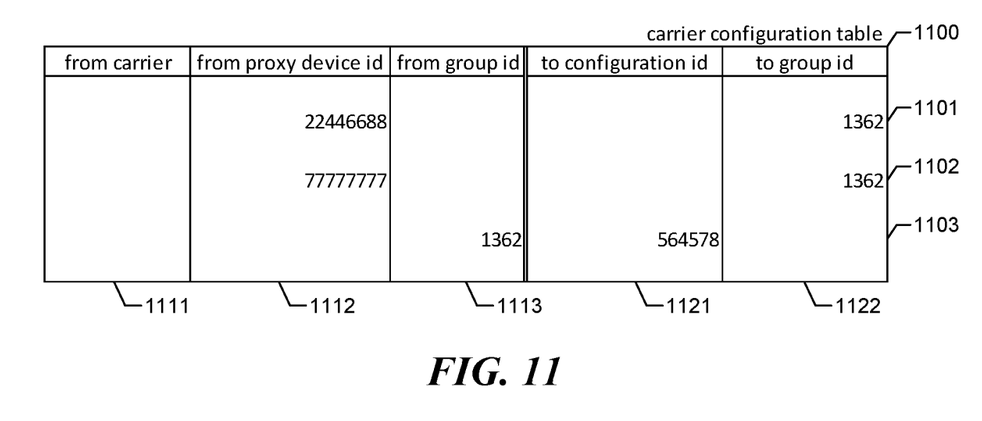
FIG. 11 is a table diagram showing a sample carrier configuration table that may be used by the facility in some examples to store correspondences specified by carriers between configuration IDs defined in the configuration table and particular devices.

FIG. 11 is a table diagram showing a sample carrier configuration table that may be used by the facility in some examples to store correspondences specified by carriers between configuration IDs defined in the configuration table and particular devices. The carrier configuration table 1100 is structured in a manner similar to the buyer configuration table shown in FIG. 9 and discussed above. For example, rows 1101-1102 collectively indicate that the devices having proxy device IDs 22446688 and 77777777 are assigned to a device group having group ID 1362. Row 1103 indicates that these two devices are assigned configuration ID 564578. Based on this assignment and the contents of rows 804 and 805 of the configuration table shown in FIG. 8, these two devices are assigned the provisioning measures "a carrier ID registry setting to 'Cirrus'" and "set Cirrus brand wallpaper".

Figure 12:
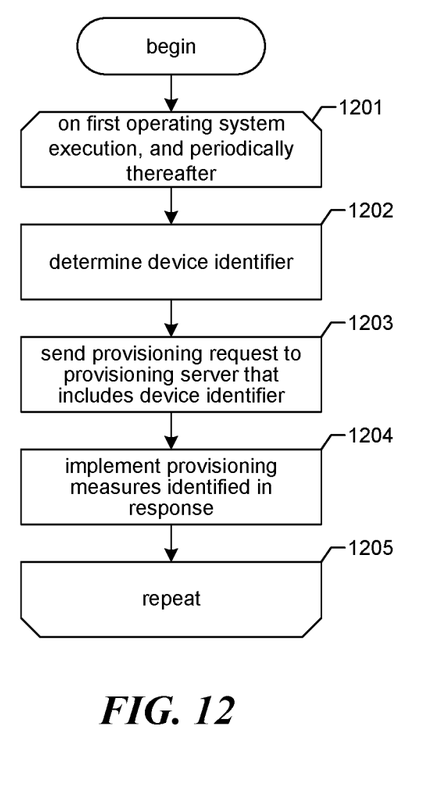
FIG. 12 is a flow diagram showing a process that may be performed by the facility in some examples in a device to send provisioning requests.
Figure 13:
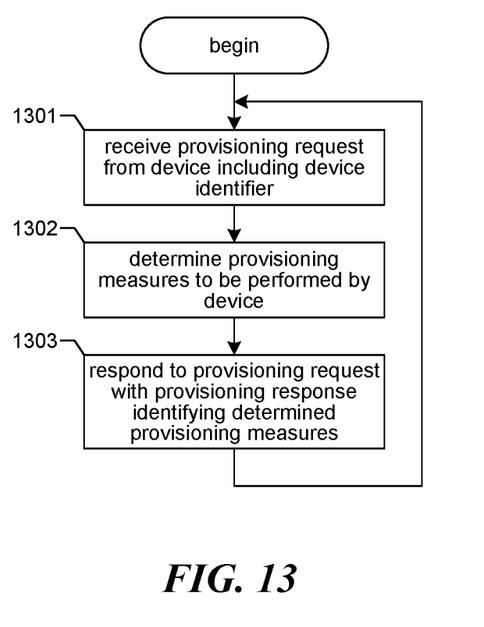
FIG. 13 is a flow diagram showing a process that may be performed by the facility in some examples in a provisioning server to respond to provisioning requests.

FIG. 12 is a flow diagram showing a process that may be performed by the facility in some examples in a device to send provisioning requests. The facility loops through acts 1201-1205 on first execution of the operating system, and periodically thereafter, such as daily, weekly, monthly, quarterly yearly, etc. At 1202, the facility determines the device's device identifier. In various examples, the facility uses one or more different mechanisms for determining the device identifier, including a value produced for the device by its Trusted Platform Module, a value produced for the device by the secure element of its Near-Field Communication module, network interface Media Access Control address, processor serial number, motherboard serial number, operating system serial number, user email address or other information inputted by the user, etc. In some examples, the facility uses different such mechanisms in different types of devices. At 1203, the facility sends a provisioning request containing the device identifier determined for the device at 1202 to the provisioning server. In some examples, the facility includes in the provisioning request additional information about the device that may affect the proper set of provisioning measures for the device, including information about programs installed, device usage information and device location, user identity, etc. At 1204, the facility implements provisioning measures identified in the provisioning server's response to the provisioning request sent at 1203. The process by which the provisioning server generates this provisioning response is shown in FIG. 13 and discussed below. At 1205, the facility waits until the prescribed period elapses again, then proceeds to 1202.

FIG. 13 is a flow diagram showing a process that may be performed by the facility in some examples in a provisioning server to respond to provisioning requests. At 1301, the facility receives a provisioning request from a device that includes the device's device identifier. At 1302, the facility determines provisioning measures to be performed by the device. In some examples, 1302 involves traversing a series of mappings stored in the tables discussed above. As one example, the facility uses the proxy identifier table shown in FIG. 4 and discussed above to map the received device ID to the corresponding proxy device ID; uses the buyer configuration table shown in FIG. 9 and discussed above to map from this proxy device ID to a configuration ID; and uses the configuration table shown in FIG. 8 and discussed above to map from this configuration ID to one or more provisioning measures. In some examples, at 1302, the facility takes advantage of caches it maintains, such as a cache to configuration ID table shown in FIG. 14 and/or a cache to provisioning measures table shown in FIG. 15, both discussed below. In some examples, 1302 involves combining groups of provisioning measures specified for the device, such as combining groups of provisioning measures specified by different actors such as buyer, carrier, manufacturer, and user, etc.; and/or combining groups of provisioning measures specified separately for the device by the same actor, such as provisioning measures specified by the buyer for all of its devices, provisioning measures specified by the buyer for its devices in a device group, and/or provisioning measures specified by the buyer specifically for the device. At 1303, the facility responds to the provisioning request received at 1301 with the provisioning measures determined at 1302. After 1303, the facility continues and 1301 to receive and process the next provisioning request.

Figure 14:
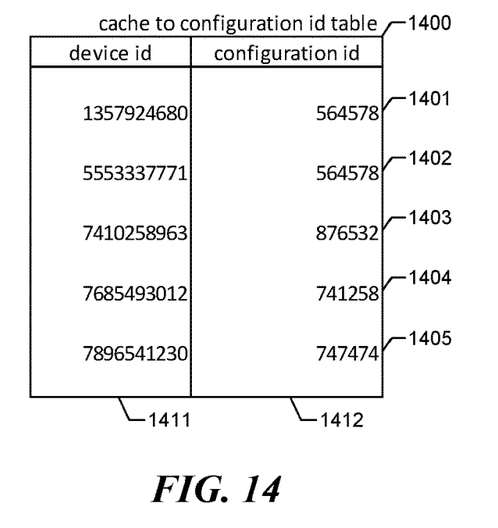
FIG. 14 is a table diagram showing a sample cache to configuration ID table that may be used by the facility in some examples to cache configuration IDs for device IDs.

FIG. 14 is a table diagram showing a sample cache to configuration ID table that may be used by the facility in some examples to cache configuration IDs for device IDs. In some examples, the facility generates or regenerates the cache to configuration ID table by joining the proxy identifier table shown in FIG. 4, the buyer table shown in FIG. 6, the buyer configuration table shown in FIG. 9, the carrier table shown in FIG. 10, and the carrier configuration table shown in FIG. 11. In some examples, the facility periodically regenerates the entire cache to configuration ID table, such as hourly. In some examples, the facility adds, modifies, or deletes particular rows of the cache to configuration ID table in response to modifications to the underlying tables. The cache to configuration ID table 1400 is made up of rows, such as rows 1401-1405, each corresponding to a different device. Each row is divided into the following columns: a device ID column 1411 containing the device ID of the device to which the row corresponds; and a configuration ID column 1412 containing a configuration ID assigned to the device to which the row corresponds. For example, row 1401 indicates that the device having device ID 1357924680 is assigned configuration ID 564578. The facility forms row 1401 by traversing row 402 of the proxy identifier table shown in FIG. 4, row 1001 of the carrier table shown in FIG. 10, and rows 1101 and 1103 of the carrier configuration table shown in FIG. 11. When the facility receives a provisioning request containing device ID 1357924680, the facility searches column 1411 of the cache to configuration ID table for this device ID, finding it at the intersection with row 1401. The facility reads configuration ID 564578 at the intersection of row 1401 with configuration ID column 1412, and looks up this configuration ID in configuration ID column 811 of the configuration table shown in FIG. 8, finding it in rows 804 and 805 of the configuration table. The facility reads the provisioning measures "set carrier ID registry setting to 'Cirrus'" and "set Cirrus brand wallpaper" from the intersections of these two rows with provisioning measure column 812, and returns them in response to the provisioning request.

Figure 15:
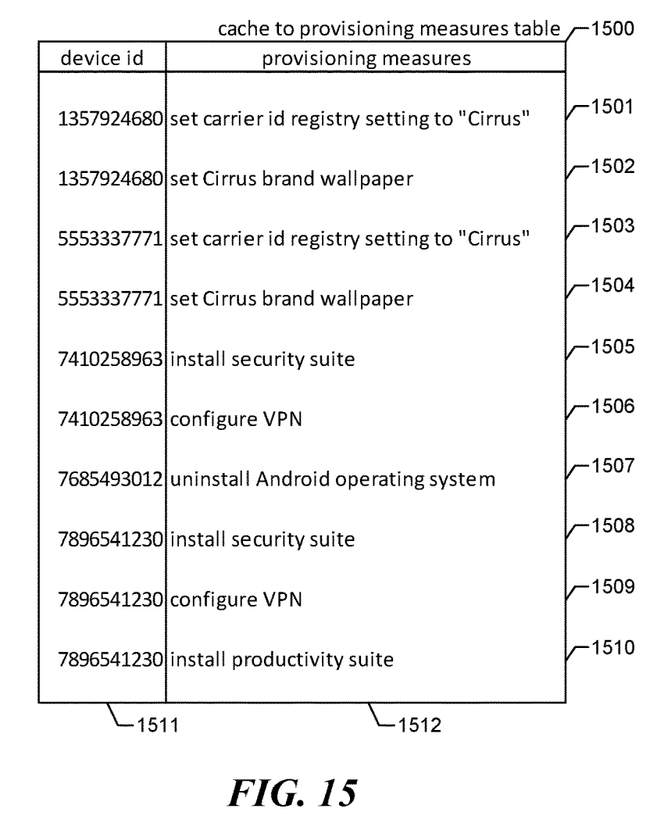
FIG. 15 is a table diagram showing a sample cache to provisioning measures table that may be used by the facility in some examples to cache provisioning measures for device IDs

FIG. 15 is a table diagram showing a sample cache to provisioning measures table that may be used by the facility in some examples to cache provisioning measures for device IDs. In some examples, the facility generates or regenerates the cache to provisioning measures table by joining the proxy identifier table shown in FIG. 4, the buyer table shown in FIG. 6, the buyer configuration table shown in FIG. 9, the carrier table shown in FIG. 10, the carrier configuration table shown in FIG. 11, and the configuration table shown in FIG. 8. In some examples, the facility periodically regenerates the entire cache to provisioning measures table, such as hourly. In some examples, the facility adds, modifies, or deletes particular rows of the cache to provisioning measures table in response to modifications to the underlying tables. The cache to provisioning measures table 1400 is made up of rows, such as rows 1501-1510, each corresponding to a provisioning measure assigned to a device. Each row is divided into the following columns: a device ID column 1511 containing the device ID of the device to which the row corresponds; and a provisioning measures column 1512 containing a provisioning measure assigned to that device. For example, rows 1501-1502 collectively indicate that the device having device ID 1357924680 is assigned the provisioning measures "set carrier ID registry setting to 'Cirrus'" and "set Cirrus brand wallpaper". The facility forms row 1501 by traversing row 402 of the proxy identifier table shown in FIG. 4, row 1000 one of the carrier table shown in FIG. 10, rows 1101 and 1103 of the carrier configuration table shown in FIG. 11, and rows 804-805 of the configuration table shown in FIG. 8. When the facility receives a provisioning request containing device ID 1357924680, the facility searches column 1511 of the cache to the provisioning measures table for this device ID, finding it at the intersections with rows 1501 and 1502. The facility reads the provisioning measures "set carrier ID registry setting to 'Cirrus'" and "set Cirrus brand wallpaper" from the intersections of these two rows with provisioning measure column 1512, and returns them in response to the provisioning request.

In some examples, the facility provides a processor-based device, comprising: a processor; and a memory having contents that cause the processor to, in response to execution of an operating system by the processor: discern an identifier that identifies the device; transmit the identifier to a server computer system; receive from the server computer system provisioning measures specified for the device; and in response to receiving the specified provisioning measures, perform the specified provisioning measures on the device.

In some examples, the facility provides a computer-readable medium having contents configured to cause a computing system to: discern an identifier that identifies the device; transmit the identifier to a server computer system; receive from the server computer system provisioning measures specified for the device; and in response to receiving the specified provisioning measures, perform the specified provisioning measures on the device.

In some examples, the facility provides a method in a computing system, the method comprising: discerning an identifier that identifies the device; transmit the identifier to a server computer system; receiving from the server computer system provisioning measures specified for the device; and in response to receiving the specified provisioning measures, performing the specified provisioning measures on the device.

In some examples, the facility provides a computer-readable medium having contents configured to cause a computing system to: receive requests, each request originated by a device, each request containing a device identifier identifying the device; for each received request, access a mapping that maps from the device identifier contained by the request to one or more provisioning measures specified for the originating device; and send a response to the originating device that identifies the one or more provisioning measures mapped to from the device identifier contained by the request.

In some examples, the facility provides a method in a computing system, the method comprising: receiving requests, each request originated by a device, each request containing a device identifier identifying the device; for each received request, accessing a mapping that maps from the device identifier contained by the request to one or more provisioning measures specified for the originating device; and sending a response to the originating device that identifies the one or more provisioning measures mapped to from the device identifier contained by the request.

In some examples, the facility provides a computer-readable medium storing a provisioning control data structure, the data structure comprising a plurality of entries, each entry comprising: first information identifying a device; and second information identifying one or more provisioning measures to be performed with respect to the identified device, such that the contents of the data structure are usable to determine one or more provisioning measures to be performed with respect to a particular device.

It will be appreciated by those skilled in the art that the above-described facility may be straightforwardly adapted or extended in various ways. While the foregoing description makes reference to particular embodiments, the scope of the invention is defined solely by the claims that follow and the elements recited therein.

We claim:

1. A computer system comprising:
a processor; and
a computer readable storage medium having stored thereon program code that, when executed by the processor, causes the processor to:
receive, from a device, a first request for provisioning the device, wherein the first request contains a device identifier identifying the device;
access a mapping that maps the device identifier to a first provisioning measure, wherein the first provisioning measure is for provisioning the device when an operating system is first executed;
send, to the device, a first response that identifies the first provisioning measure;
receive, from the device at a first interval after the first request, a second request for provisioning the device, the second request containing the device identifier;
in response to receiving the second request, forego sending a provisioning measure specified for the device to avoid causing the performing of the first provisioning measure on the device;
receive a second provisioning measure to re-provision the device, wherein the second provisioning measure is for provisioning the device after the first provisioning measure is used to provision the device;
store a second mapping of the device identifier to the second provisioning measure;
receive, from the device at a second interval after the second request, a third request containing the device identifier and additional information not found in the second request;
access the second mapping of the device identifier to the second provisioning measure based on receiving the third request with the additional information; and
in response to receiving the third request, send, to the device, a second response that identifies a second provisioning measure, wherein the second response is configured to cause the second provisioning measure to re-provision the device.

2. The computer system of claim 1 wherein the first execution of the operating system on the device corresponds to a very first time the operating system is executed by the device.

3. The computer system of claim 1 wherein the first request is received in response to expiration of a pre-specified time period on the device.

4. The computer system of claim 1 wherein the program code is configured to further cause the computing system to:
receive an indication that the device has been stolen; and
in response to receiving the indication, store a third mapping that maps from the device identifier to a third provisioning measure suited to a stolen device.

5. The computer system of claim 1 wherein the program code is configured to further cause the computing system to:
receive, from a seller identity, an indication that the device identifier is associated with a device that is sold;
receive from an organization identity an instruction that at least some of the devices it purchases are to be subjected to the first provisioning measure; and
based at least on the received indication and the received instruction, store the first mapping from the device identifier to the first provisioning measure.

6. The computer system of claim 1 wherein the program code is configured to further cause the computing system to:
receive from a manufacturer identity a mapping from a proxy identifier of the device to the device identifier of the device;
receive from a seller identity an indication that the seller identity sold the device having the proxy device identifier to an organization identity;
receive from an organization identity an instruction that at least some of the devices it purchases are to be subjected to the first provisioning measure; and
based at least on the received mapping, the received indication, and the received instruction, store the first mapping from the device identifier to the first provisioning measure.

7. The computer system of claim 6 wherein the mapping from a proxy identifier of the device to the device identifier of the device is received from a seller identity that is a manufacturer or a reseller of the device.

8. The computer system of claim 1 wherein the program code is configured to further cause the computing system to:
receive from a manufacturer identity a mapping from a proxy identifier of the device to the device identifier of the device;
receive from a seller identity an indication that the seller identity sold the device having the proxy device identifier to an organization identity;
receive from the organization identity:
an instruction that the device having the proxy device identifier is a member of a provisioning group having a provisioning group identifier, and
an instruction that devices that are members of a provisioning group having the first provisioning group identifier are to be subjected to the first provisioning measure; and
based at least on the received mapping, the received indication, and the received instructions:
store a third mapping from the device identifier to the provisioning group identifier, and
store a fourth mapping from the provisioning group identifier to the first provisioning measure,
the stored third and fourth mappings together comprising first mapping from the device identifier to the first provisioning measure.

9. The computer system of claim 1 wherein the computer-readable medium has contents configured to further cause the computing system to:
receive from a manufacturer identity a mapping from a proxy identifier of the device to the device identifier of the device;
receive from a wireless carrier identity an indication that the wireless carrier registered a device having the proxy device identifier;

receive from the wireless carrier identity an instruction that at least some of the devices it registers are to be subjected to the first provisioning measure; and based at least on the received mapping, the received indication, and the received instruction, store the first mapping from the device identifier to the first provisioning measure.

10. The computer system of claim 1 wherein the computer-readable medium has contents configured to further cause the computing system to:

receive from a manufacturer identity a mapping from a proxy identifier of the device to the device identifier of the device;

receive from a wireless carrier identity an indication that the wireless carrier registered the device having a proxy device identifier;

receive from the wireless carrier identity:
an instruction that the device having the proxy device identifier is a member of a provisioning group having a provisioning group identifier, and
an instruction that devices that are members of the provisioning group having the provisioning group identifier are to be subjected to the first provisioning measure; and based at least on the received mapping, the received indication, and the received instructions:
store a second mapping from the device identifier to the provisioning group identifier, and
store a third mapping from the provisioning group identifier to the first provisioning measure, wherein
the second mapping and the third mapping together comprising the first mapping from the device identifier to the first provisioning measure.

11. The computer system of claim 1 wherein the first provisioning measure is received for an organization identity.

12. A method comprising:
receiving, by a computer system from a device, a first request for provisioning the device, wherein the first request contains a device identifier identifying the device;
accessing, by the computer system, a mapping that maps the device identifier to a first provisioning measure, wherein the first provisioning measure is for provisioning the device when an operating system is first executed;
sending, by the computer system to the device, a first response that identifies the first provisioning measure;
receiving, by the computer system from the device at a first interval after the first request, a second request for provisioning the device, the second request containing the device identifier;
in response to receiving the second request, forego sending, by the computer system, a provisioning measure specified for the device to avoid causing the performing of the first provisioning measure on the device;
receiving, by the computer system, a second provisioning measure to re-provision the device, wherein the second provisioning measure is for provisioning the device after the first provisioning measure is used to provision the device;
storing, by the computer system, a second mapping of the device identifier to the second provisioning measure;
receive, by the computer system from the device at a second interval after the second request, a third request containing the device identifier and additional information not found in the second request;

accessing, by the computer system, the second mapping of the device identifier to the second provisioning measure based on receiving the third request with the additional information; and in response to receiving the third request, send, by the computer system to the device, a second response that identifies a second provisioning measure, wherein the second response is configured to cause the second provisioning measure to re-provision the device.

13. The method of claim 12, wherein the first provisioning measure is used a very first time the operating system is executed by the device.

14. The method of claim 12, wherein the first request is received in response to expiration of a pre-specified time period on the device.

15. The method of claim 12 wherein the first provisioning measure is specified for the device by an organization identity.

16. The method of claim 12 further comprising:
receiving an indication that the device has been stolen; and
in response to receiving the indication, storing a third mapping that maps from the device identifier to a third provisioning measure suited to a stolen device.

17. The method of claim 12 further comprising:
receiving, from a seller identity, an indication that the device identifier is associated with a device that is sold;
receiving from an organization identity an instruction that at least some of the devices it purchases are to be subjected to the first provisioning measure; and
based at least on the received indication and the received instruction, storing the first mapping from the device identifier to the first provisioning measure.

18. The method of claim 12 further comprising:
receiving from a manufacturer identity a mapping from a proxy identifier of the device to the device identifier of the device;
receiving from a seller identity an indication that the seller identity sold the device having the proxy device identifier to an organization identity;
receiving from an organization identity an instruction that at least some of the devices it purchases are to be subjected to the first provisioning measure; and
based at least on the received mapping, the received indication, and the received instruction, storing the first mapping from the device identifier to the first provisioning measure.

19. The method of claim 12 further comprising:
receiving from a manufacturer identity a mapping from a proxy identifier of the device to the device identifier of the device;
receiving from a wireless carrier identity an indication that the wireless carrier registered the device having a proxy device identifier;
receiving from the wireless carrier identity:
an instruction that the device having the proxy device identifier is a member of a provisioning group having a provisioning group identifier, and
an instruction that devices that are members of the provisioning group having the provisioning group identifier are to be subjected to the first provisioning measure; and
based at least on the received mapping, the received indication, and the received instructions:
storing a first mapping from the device identifier to the provisioning group identifier, and storing a second mapping from the provisioning group identifier to the first provisioning measure, wherein the stored first and second mappings together comprising the first mapping from the device identifier to the first provisioning measure.

20. A non-transitory computer readable storage medium having stored thereon program code executable by a computer system, the program code causing the computer system to:

receive, from a device, a first request for provisioning the device, wherein the first request contains a device identifier identifying the device;

access a mapping that maps the device identifier to a first provisioning measure, wherein the first provisioning measure is for provisioning the device when an operating system is first executed;

send, to the device, a first response that identifies the first provisioning measure;

receive, from the device at a first interval after the first request, a second request for provisioning the device, the second request containing the device identifier;

in response to receiving the second request, forego sending a provisioning measure specified for the device to avoid causing the performing of the first provisioning measure on the device;

receive a second provisioning measure to re-provision the device, wherein the second provisioning measure is for provisioning the device after the first provisioning measure is used to provision the device;

store a second mapping of the device identifier to the second provisioning measure;

receive, from the device at a second interval after the second request, a third request containing the device identifier and additional information not found in the second request;

access the second mapping of the device identifier to the second provisioning measure based on receiving the third request with the additional information; and in response to receiving the third request, send, to the device, a second response that identifies a second provisioning measure, wherein the second response is configured to cause the second provisioning measure to re-provision the device.

\* \* \* \* \*